United States Patent Office 3,137,750
Patented June 16, 1964

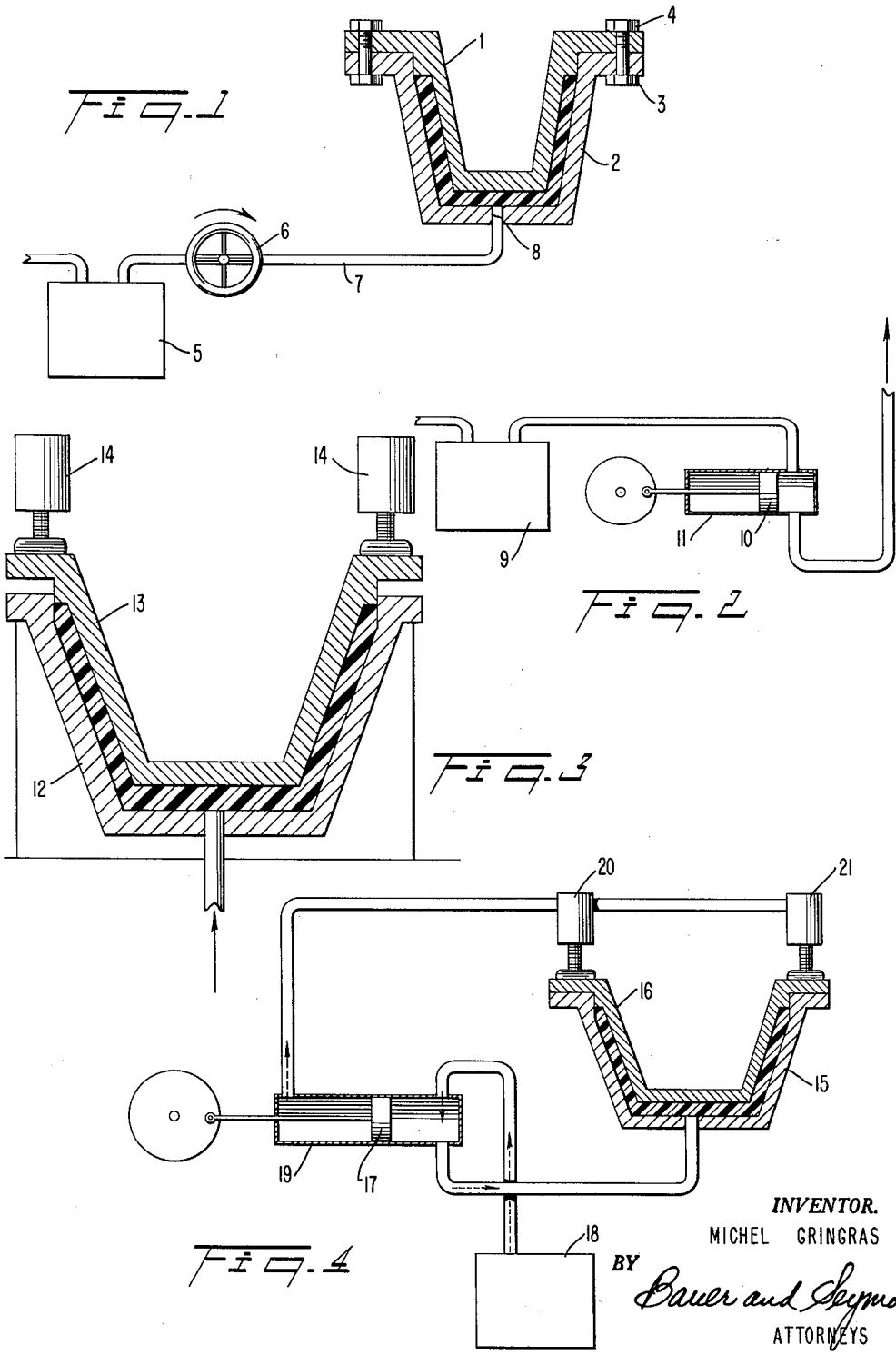

3,137,750
INJECTION MOLDING OF FABRIC REINFORCED
PLASTICS
Michel Gringras, Paris, France, assignor to Compagnie
de Saint-Gobain, Neuilly-sur-Seine, France
Filed Mar. 10, 1961, Ser. No. 94,818
Claims priority, application France Mar. 14, 1960
7 Claims. (Cl. 264—257)

This invention relates to an improvement in the manufacture of shaped objects from plastic materials containing porous reinforcing fabrics, particularly by injection.

Large objects having excellent physical properties can be produced by injecting a liquid polymerizable resin under pressure into a mold, between the two halves of which has been placed a reinforcement generally composed of a fibrous fabric. Experience has shown that impregnation of the heart of the reinforcement is more readily accomplished by that process than by the usual molding methods in which layers of the plastic material are shaped under pressure, and that the molding by injection produces objects which are mechanically superior.

Nonetheless, the considerable losses of pressure which impede the passage of the liquid resin through the reinforcement in the mold reduce the speed of the injection and, particularly for pieces of substantial size, make the time of the injection for each piece excessively long.

In order to reduce the time of injection, it is possible to increase the pressure of injection but that requires the use of molds of high mechanical resistance, which are costly, and inevitably produces a displacement of the fibers of the reinforcement which is harmful to the appearance and the mechanical qualities of the pieces obtained. This phenomenon called washing, which is already appreciable with a reinforcement composed of glass fabric, becomes particularly severe with reinforcements of cut fibers, practically limiting the process to the use of reinforcements composed of fabrics.

The processes of injection require at the end of the operation, at the time when the mold is entirely filled with the resin, a prolongation of the injection in order to scavenge the mold of the bubbles of air which inevitably remain occluded in the resin because of the porous structure of the reinforcement, and this must be continued until the resin issues clear from all the orifices of the mold, resulting in a loss of resin which can be relatively important if it is not of a type that can be used again.

The process of injection, which is the object of this invention, enables one to eliminate these various imperfections and to use not only fibrous fabrics but reinforcements constituted by cut fibers.

It is an object of the invention to reduce the time of injection molding where porous reinforcements are used, to mold objects with porous reinforcements by injection molding without harmful distortion of the reinforcement or channeling of the plastic material, and to produce objects of reinforced plastic of superior physical properties. The objects of the invention are accomplished generally speaking by injecting the resins into the mold containing the penetrable reinforcement under pulsating pressure, that is to say, under pressure which varies periodically. There is thus assured, without displacement of the fibers of the reinforcement placed between the two parts of the mold, a complete penetration and rapid progression of the resin through the reinforcement.

Under the effect of the pulsating pressure the mold and/or the reinforcement undergo an elastic deformation which, at its maximum pressure favors the channeling of the resin in the larger interstices of the reinforcement and consequently, when the pressure decreases and the mold or the reinforcement regain elastically their original form tends to compel the resin to penetrate the finer interstices.

One may accordingly assume that the alternation in the direction of flow of the resin around the fibers at each period of the pulsation, and the relative brevity of the pulsations explain the fact that practically speaking there is no displacement of the fibers of the reinforcement even when cut fibers are used.

The applicant has discovered that while using small pressures of impregnation, usually equal to 2 kgs. per square cm. at maximum, it is possible because of this invention to reduce by one-half or more the time of injection compared to known processes of injection, and that in particular, the pulsations communicated to the resin are sufficient to complete the division, the ejection and the evacuation of air bubbles which might otherwise be imprisoned between the reinforcement and the resin during the progression of the latter through the reinforcement thus eliminating the necessity of continuing the injection to purge the mold of occluded air.

The characteristics, frequency and amplitude of the modulation given to the pressure of the resin depends upon the dimensions of the product which is being molded, the form, the dimensions, and the structure of the mold itself, upon the nature and the thickness of the reinforcement, upon the pressure adopted for the injection, and upon the fluidity of the resin employed. Generally speaking frequencies from .2 to 5 pulsations per second and amplitudes of pressure between 0 and 10 kgs. per square cm. are satisfactory. The pulsating pressure communicated to the resin during its injection into the mold may be obtained by appropriate means which produces periodic variation in pressure in the flowing resin. For example, beginning with a supply of resin under constant pressure one can provide means such as valves which cyclically reduce the pressure given to the resin for injection to the mold, the value of this pressure varying between that of the constant pressure of the feed and a value low or null. It is also possible to impose an alternative pressure upon a normal pressure of supply, the pressure of injection then varying between a maximum and minimum value, the minimum value being zero, or even negative in certain cases. One can, notably, use the alternative displacement of a piston in the interior of a cylinder of selected size, filled with liquid resin and communicating with the injection pipe. The displacement of the piston in forward steps, or in forward steps interspersed with retrograde steps of lesser size, can be obtained by means of a cam of convenient shape turning in contact with the head of the piston at a chosen speed.

One may use molds of the type generally employed for the molding of polyester resins which are normally composed of two pieces providing between them, when they are closed, the space necessary for the final volume and shape of the object which is to be produced. These molds contain one or more openings at the base for the input of the resin and some apertures in their upper parts for the evacuation of air and excess of resin. The material serving for the construction of these molds may, in this invention, be relatively light while insuring a sufficient rigidity of the whole. The locking of the two parts of the mold is effectuated by any mechanical or pneumatic means, for instance those of the prior art.

Prior to the injection the reinforcement, for instance a fabric of glass fibers, is placed between the two parts of the mold in such quantity as is desired in the reinforcement considering the object which is to be molded. The reinforcement should be distributed as uniformly as possible in order to avoid preferential channeling of the fluid resin. While one may use mats or fabrics the widest industrial use contemplates preforms. It is always necessary in the case of preforms, of which the fibers are fixed at their points of contact by a connective, that the quantity of connective shall be sufficient to prevent any displacement of the fibers during the injection, but below that which is capable of entraining a substantial reduction in pressure in the interior of the mold and thus to correct an increase of the time of injection. For example, one may use according to the structure of the reinforcement, the form of the mold, and the nature of the resin, a quantity of connective (for instance polyester resin) between 5 and 10% computed on the weight of the dry product compared to the weight of the preform. Preforms of exceptional utility are those which are described in allowed patent application Serial No. 656,510, filed May 2, 1957, now Patent No. 3,007,813. The moldings obtained by using preforms and the injection of this invention have remarkable mechanical qualities compared to equivalent moldings obtained by prior art pressing processes. Thus, with the same polyester resin one obtains mechanical properties of the same order for a layered object containing 25% of glass in the form of cut fibers produced by the pulsating injection of this case, and a layered object obtained by pressing the same polyester upon 50% of glass in the form of glass fabric of standard quality, thus demonstrating that in spite of the use of one half the glass the mechanical resistance of the layered object produced by pulsating injection is not substantially reduced.

To improve the mechanical properties of the moldings obtained by the process of this invention, one may dry the reinforcement, for instance, by passage of a current of dry hot air through it after it has been placed in the mold and prior to the injection. This drying step is known in itself and is not a novel part of this invention.

In applying the process it is advantageous to use resins of low or medium viscosity, hardening them in situ in any known way appropriate to the nature of the resin being used, as soon as the injection is completed.

When operations are carried out in sequence it is possible to carry out the injection at elevated temperature to reduce the viscosity of the resin and the time and molding by employing catalysis. In such cases the mold is provided with a heating means and the injection can be carried out in temperatures reaching, for instance, 50° C. when the resin being employed is a polyester, the polymerization being carried out thereafter by heating the mold and its contents to a higher temperature, at which polymerization proceeds most favorably. The removal from the mold is carried out in the usual way and the mold is put back into use.

In order to increase the speed of production by further reducing the time for injection one may temporarily increase, during the injection, the space provided for the resin on the inside of the mold, which facilitates its penetration and its propagation through the reinforcement. Thus, one may leave the mold open with a selected gap under the effect of the pressure of injection throughout the injection. At the end of the injection the mold is then closed by a selected means which may be either mechanical or pneumatic in nature, which induces a compression of the reinforcement and the expulsion of the excess of resin from the mold. In this way the percentage composition of the molded piece as to glass and plastic is made equal to that which was contemplated.

One may also introduce into the partly open mold only that quantity of resin which is strictly necessary to the molding. The resin at the end of the injection only covers a part of the mold, the impregnation of the whole of the reinforcement and the filling of the mold being accomplished by progressively closing the mold. Experience shows that in the foregoing two cases the mechanical properties of the two pieces are as good as in the process of injecting into a closed mold but that the saving in time is twice as much when the space in the open mold is twice that of the closed mold.

According to another characteristic of the invention combining the effects of pulsating injection with the limited opening and closing of the mold to reduce the time of injection and aid the discharge of occluded air, one may, during the injection, impose upon one of the parts of the mold in the direction of its opening and closing an alternating movement of which the frequency and the amplitude are related to the frequency and amplitude of the pulsations of injection. In effect, by a convenient regulation taking into consideration the form, the dimension and the structure of the mold, one may provide that the back pressure inside the mold shall be at a minimum when the amplitude of the pulsation of injection is a maximum and inversely in the following ways, so that the penetration of the resin is facilitated by the temporary opening of the mold at one time and that the molded piece shall resume its normal dimensions at a later time when the pressure of injection is momentarily reduced or at zero. For fair sized pieces, the regulation of the alternating movement of the mobile part of the mold may be varied with respect to the pulsation of injection as the injection proceeds to offset the time which it takes the pulsation of injection to travel through the resin and reinforcement. This lapse of time increases necessarily with the progress of the resin in the mold.

The present invention will be more clearly understood with the help of the accompanying drawings, but it is to be noted that this invention may be carried out by other embodiment and by mechanism different from that specifically selected for illustration.

FIG. 1 is a schematic view of a pulsating pressure type feeding apparatus as described in the accompanying specification.

FIG. 2 shows another embodiment of the apparatus of FIG. 1.

FIG. 3 is a vertical sectional view of a mold of the type disclosed in the accompanying specification.

FIG. 4 is a schematic view of the mold of FIG. 3 and the connected resin feeding apparatus according to the specification.

We refer now more particularly to FIG. 1. Upper part 1 of a conventional mold is secured to lower part 2 by means of bolts 3 and nuts 4. The resin, submitted to pressure in vessel 5, is urged into the mold through conduit 7 connected with aperture 8 managed in the bottom of part 2. A rotating valve 6 varies the flow of resin through conduit 7 and brings about the pulsating injection onto the mold.

In FIG. 2, the pressure of the resin coming from vessel 9 is varied by means of conventionally actuated piston 10 moving in cylinder 11.

FIG. 3 shows a mold according to the invention which comprises lower part 12 and upper part 13, the latter being allowed to rise due to the incoming resin. Jacks 14 are provided to push part 13 downwardly again and to press it against part 12.

FIG. 4 shows a mold and connected resin feeding system in which the upper part 16 of the mold is lifted from lower part 15 by the incoming resin when pressure is added through the action of piston 17 to the resin coming from pressure vessel 18. Jacks 20 and 21 which are fluid actuated and connected to the backstroke part of cylinder 19 do not oppose the lifting action as displacement to the right of cylinder 19 brings about a reduced pressure of the actuating fluid. Retraction of piston 17 will cause both jacks to press the two parts of the mold against each other.

The examples which follow illustrate the invention without limitation of the generality of what is elsewhere written and claimed.

*Example 1*

To make a pail in the form of a truncated cone of polyester resins reinforced by glass fibers, 26 cm. high, 22 cm. in diameter at the bottom, and 30 cm. in diameter at the top opening, there was employed a rigid mold made of polyester resin reinforced by glass fibers and composed of two parts which, when the mold is closed, leave between them a free space of 3 mm. at the bottom and sides, this free space defining the shape and thickness of the pail. The bottom of the female mold contained at its center a tube of 8 mm. interior diameter by which the resin was injected. The upper edge of the female mold contained two openings of 8 mm. diameter for the escape of air scavenged by the resin. The two halves of the mold were closed without a joint by means of six clamps equally spaced around the rim.

The reinforcement was constituted by a preform of glass fibers weighing 380 grams interconnected by means of an emulsified connector known as Stratyl BL13 weighing 8% with respect to the weight of the preform. This preform was heated 5 minutes at 180° to solidify the connective and to dry it and it was then placed between the two parts of the mold.

As a polyester resin the mixture of 80% of resin called commercially Stratyl A16 and 20% of resin called Stratyl A34 was mixed with 2% by weight of benzoyl peroxide catalyst. The pulsating injection was obtained by a pulsating piston communicating with the injection tube. The piston was 29 mm. in diameter and had a stroke of 30 mm. The reinforcement having been placed in the mold, and the two parts of the mold having been coated with a demolding agent of standard type, they were closed and sealed. A pump drove the resin into the body of the pulsating apparatus filling it completely down to the opening into the mold. The pressure maintained by the pump was 1 kg./cm.$^2$ which was controlled with the aid of a manometer and remained constant throughout the injection.

Once this pressure had been established the pulsating piston was put into action at a cadence of two periods per second which varied the pressure on the inside of the mold between 0 and 5 kg./cm.$^2$. The resin penetrated the reinforcement and drove the air out of the vents. The operation was stopped as soon as the resin began to appear in the vents. It became clear very rapidly and the operation was stopped. To inject 790 grams of resin required 3 minutes, 10 seconds which is at a rate of 15 kg. per hour. The mold was put in a chamber at 100° C. until polymerization was completed. The mold was opened and the pail was withdrawn.

The pail weighed 1170 grams, was translucent and gave off a clear sound when hit sharply. There was practically no displacement of fibers in any part of the molding and the pail could be put into service immediately after trimming its edges. Its content of glass fibers was 32.4%. The mold was cleaned, coated with demolding agent and put back in service immediately. It served 100 times furnishing perfect pieces.

Test pieces were cut out of different parts of the pail to the size of standard test pieces and subjected to different mechanical tests. The resistance to traction and to flexing of these test pieces was superior to that of identical test pieces obtained from prior art moldings with the same resin content, and the same content of glass in the form of a mat. This was a mean of 1455 kg./cm.$^2$ under traction as against 680 kg./cm.$^2$ for the prior art pieces and 1953 kg./cm.$^2$ for the flexing test against 1780 kg./cm.$^2$ for the prior art pieces.

*Example 2*

Starting with the same raw materials and under the same conditions set forth in Example 1 but omitting the pulsating mechanism, the injection required 7 minutes, 18 seconds to inject the same quantity of resin which equalled 6.5 kg. per hour. Furthermore in order to bring the resin clear out of the vents the injection was prolonged 7 to 8 minutes which amounted to a loss of resin about equal to that required for impregnation. After demolding an obvious displacement was seen among the fibers and a slight accumulation of fibers was gathered near the bend between the bottom and the wall of the pail as well as near the upper edge, resulting in a material irregularity in the mechanical properties of the test pieces which were subjected to comparison with the test pieces of Example 1. In every instance the average values for the test was materially less than that of those which were given from the pail made by pulsating injection.

*Example 3*

The same mold used in Example 1 was employed with the same raw materials but at the beginning the female mold was elevated 3 mm. above its normal position. The parts of the mold were held in this fixed position by interposing shims between the upper edges of the layer and the female parts, upon which the parts were clamped. A pressure of injection of 1 kg. was used with a pulsation of frequency and amplitude as in Example 1. 790 grams of resin were injected in 1 minute, 32 seconds which indicates a rate of 31 kg. per hour. The shims were removed and the parts of the mold were progressively closed until closure was complete, forcing the resin to fill the mold and to appear at the vents. The pail contained 33% of fibers without substantial displacement and had the same characteristics as the pail of Example 1.

The same operation practiced without pulsation permitted only a rate of 17 kg. per hour, slightly more than half of the rate obtained with pulsation.

*Example 4*

A preform of cut glass fibers weighing 380 grams and containing phenolic resin of 75% reactive solids having specific gravity equal to 1.25 and viscosity at 25° C. equal to 200 centipoises was prepared. A light alloy mold having polished inner walls was coated with a demolding agent. After having clamped the preform between the two parts of the mold the liquid resin was injected under a pressure of 0.8 kg./cm.$^2$ with the pulsation and frequency of Example 1. The resin issued from the vents at the end of 170 seconds. Having thus introduced 800 grams of liquid resin into the mold, the mold was heated to 135° for 490 seconds to harden the resin. It was cooled and demolded producing a homogeneous molded piece, containing 39% glass fibers, of exceptionally high mechanical properties by the foregoing tests.

The advantages of the invention include high speed of molding, more rapid and better use of equipment, improved uniformity of product, improved uniformity in the mechanical properties of the product, and a substantial elimination of waste by overflow from the mold.

The invention includes a process for injection molding of reinforced plastic objects in which the reinforcement is fibrous, by injecting the resin into the mold under pulsation. This pulsation can be obtained by establishing a constant pressure of injection which is increased or diminished or both so as to give to the injected resin a pressure varying periodically between zero or very little and the pressure of injection. In another method of using the invention a normal pressure of injection is established and an alternative pressure is superimposed upon it varying between a maximum value superior to the injection pressure and a lower value which may decline to zero or even become negative. The pressure of injection is usually at least equal to 2 kg./cm.$^2$. The pulsations are on the order of 0.2 to 5 pulsations per second with an amplitude between 0 and 10 kg./cm.$^2$. One may use cut fibers, mats or preforms but preforms in which the fibers are joined at their points of contact by something like 5 to 10% of the weight of the fibers of a resinous bonding agent are preferred.

This invention is applicable to all materials of plastic nature which can be molded by injection including such resins as polyvinyl chloride, phenolic resins, polyesters and the like, rubber and artificial rubbers. In all cases the reinforcement must maintain its condition and its strength in the presence of the plastic material.

During the injection one may temporarily increase the space offered to the resin inside the mold to improve its penetration and movement. The mold can be thus expanded under the pressure of injection throughout the injection or it may be closed during the injection. Closing can be continuous or stepwise. The mold can be opened and closed in steps in synchronism with the pulsations of the injection mechanism.

As many apparently widely different embodiments of the present invention may be made without departing from the spirit and scope thereof, it is to be understood that the invention is not limited to the specific embodiments.

What is claimed is:

1. A method of forming plastic material with an impregnated reinforcement which comprises preparing a space having boundaries establishing the form of the desired article, mounting within said space a reinforcement comprised of a fabric penetrable to the plastic material, filling said space and fabric with a hardenable plastic material by injecting the plastic material into the space under varying pressure of the plastic, repeatedly and substantially raising and lowering the pressure of injection during the impregnation of the said reinforcement, and hardening the reinforced article.

2. A method according to claim 1 in which the pressure of injection varies repeatedly and periodically during the filling between the maximum pressure of injection and substantially no pressure.

3. A process according to claim 1 in which the maximum injection pressure is circa 2 kg./cm.$^2$.

4. A process according to claim 1 in which the pulsations are between about 0.2 and 5 per second, and the pressure of each pulsation varies in the range between 0 as a minimum and 10 kg./cm.$^2$ as a maximum.

5. A method of molding plastic material with an impregnated reinforcement which comprises preparing an enclosed, vented space having the shape of a desired article, mounting within said space a reinforcement comprised of a fabric penetrable to the plastic material, injecting stepwise into said space and through the reinforcement therein a charge of hardenable resin in liquid state by imposing upon the resin a series of pulsations including sequential increases and decreases of pressure, the maximum pressure attained being at least equal to the pressure required to fill the mold, and the minimum pressure being sufficiently reduced below the maximum pressure to substantially reduce the rate at which the liquid plastic material penetrates the mold.

6. A process according to claim 5, in which the injection pressure is circa 2 kg./cm.$^2$.

7. A process according to claim 5, in which the pulsations are between about 0.2 and 5 per second, and the pressure variation of such pulsations attains 10 kg./cm.$^2$.

References Cited in the file of this patent

UNITED STATES PATENTS

| | | |
|---|---|---|
| 2,296,295 | Shaw | Sept. 22, 1942 |
| 2,495,640 | Muskat | Jan. 24, 1950 |
| 2,938,232 | Martin | May 31, 1960 |
| 3,028,284 | Reeves | Apr. 3, 1962 |

FOREIGN PATENTS

| | | |
|---|---|---|
| 202,671 | Australia | Jan. 20, 1955 |